(12) United States Patent
Toriyama

(10) Patent No.: US 9,045,188 B2
(45) Date of Patent: Jun. 2, 2015

(54) LOWER PART STRUCTURE FOR VEHICLE

(71) Applicant: HONDA MOTOR CO., LTD., Tokyo (JP)

(72) Inventor: Eiji Toriyama, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/196,770

(22) Filed: Mar. 4, 2014

(65) Prior Publication Data

US 2014/0252797 A1    Sep. 11, 2014

(30) Foreign Application Priority Data

Mar. 8, 2013  (JP) .................................. 2013-047055

(51) Int. Cl.
| | |
|---|---|
| B62J 17/02 | (2006.01) |
| B62K 11/04 | (2006.01) |
| B62K 19/48 | (2006.01) |
| B60K 11/04 | (2006.01) |

(52) U.S. Cl.
CPC ................. *B62J 17/02* (2013.01); *B62K 11/04* (2013.01); *B62K 19/48* (2013.01); *B60K 11/04* (2013.01); *B60Y 2200/12* (2013.01)

(58) Field of Classification Search
CPC ............ B62J 17/02; B62J 17/00; B62J 11/04; B62J 2202/00; B62J 11/08
USPC ............. 180/229, 291, 68.1, 68.2, 68.4, 68.6; 296/78.1, 181.2, 191
See application file for complete search history.

(56) References Cited

U.S. PATENT DOCUMENTS

| | | | | |
|---|---|---|---|---|
| 4,570,740 | A * | 2/1986 | Hara ............................... | 180/229 |
| 4,618,020 | A * | 10/1986 | Noda et al. .................... | 180/229 |
| 4,632,206 | A * | 12/1986 | Morinaka et al. ............. | 180/229 |
| 4,633,965 | A * | 1/1987 | Tsurumi et al. ............... | 180/229 |
| 4,678,223 | A * | 7/1987 | Kishi et al. .................... | 296/78.1 |
| 4,685,530 | A * | 8/1987 | Hara ............................... | 180/219 |
| 4,709,774 | A * | 12/1987 | Saito et al. .................... | 180/229 |
| 4,830,135 | A * | 5/1989 | Yamashita ..................... | 180/229 |
| 4,913,256 | A * | 4/1990 | Sakuma ......................... | 180/229 |
| 5,330,029 | A * | 7/1994 | Yoshimura et al. ........... | 180/219 |
| 5,577,570 | A * | 11/1996 | Shiohara et al. .............. | 180/219 |
| 6,588,529 | B2 * | 7/2003 | Ishii et al. ..................... | 180/219 |
| 6,619,415 | B1 * | 9/2003 | Hasumi et al. ................ | 180/68.1 |
| 7,325,853 | B2 * | 2/2008 | Tsukui et al. ................. | 296/78.1 |
| 7,370,902 | B2 * | 5/2008 | Seki et al. ..................... | 296/78.1 |
| 7,410,025 | B2 * | 8/2008 | Sunaguchi et al. ........... | 180/229 |
| 7,510,229 | B2 * | 3/2009 | Katagiri et al. ............... | 296/78.1 |

(Continued)

FOREIGN PATENT DOCUMENTS

JP             200818904 A       1/2008

*Primary Examiner* — Brodie Follman
(74) *Attorney, Agent, or Firm* — Westerman, Hattori, Daniels & Adrian, LLP

(57) ABSTRACT

A lower part structure of a motorcycle is provided which enables air having flowed past a radiator to be guided to transversely outer sides more efficiently. In a motorcycle, a radiator is disposed forwardly of an engine and rearwardly of a front wheel, and an air guide port opening forward is provided forwardly of the radiator. A body frame and the radiator are covered with a cowling. The cowling includes side cowls covering lateral sides of the radiator, and an undercover covering a lower portion of the body frame rearwardly of the radiator. The undercover includes a V-shaped part, and air guide surfaces extending obliquely from the V-shaped part toward transversely outer rear sides.

6 Claims, 4 Drawing Sheets

(56) References Cited

U.S. PATENT DOCUMENTS

| | | |
|---|---|---|
| 7,850,221 B2* | 12/2010 | Nakata et al. ............... 296/78.1 |
| 7,987,936 B2* | 8/2011 | Yamakura et al. ........... 180/68.1 |
| 8,006,792 B2* | 8/2011 | Nakao et al. ................. 180/68.1 |
| 8,181,729 B2* | 5/2012 | Hiramatsu et al. ........... 180/68.3 |
| 8,230,958 B2* | 7/2012 | Takahashi et al. ........... 180/68.1 |
| 8,631,888 B2* | 1/2014 | Iida et al. ..................... 180/68.1 |
| 8,662,230 B2* | 3/2014 | Tsukui et al. ................. 180/219 |
| 8,690,192 B2* | 4/2014 | Yanagita ....................... 280/851 |
| 8,857,553 B2* | 10/2014 | Nakamura et al. ............ 180/229 |
| 8,881,859 B2* | 11/2014 | Nakamura .................... 180/229 |
| 2002/0153187 A1* | 10/2002 | Tsukui et al. ................. 180/219 |
| 2005/0224266 A1* | 10/2005 | Konno et al. ................. 180/68.1 |
| 2006/0048991 A1* | 3/2006 | Sunaguchi et al. ........... 180/229 |
| 2006/0054372 A1* | 3/2006 | Ohzono et al. ............... 180/229 |
| 2006/0087144 A1* | 4/2006 | Kamimura et al. .......... 296/78.1 |
| 2006/0283647 A1* | 12/2006 | Seki et al. ..................... 180/219 |
| 2007/0034429 A1* | 2/2007 | Fujii et al. .................... 180/68.1 |
| 2007/0069545 A1* | 3/2007 | Katagiri et al. ............... 296/78.1 |
| 2008/0012391 A1* | 1/2008 | Nakata et al. .................. 296/208 |
| 2008/0289893 A1* | 11/2008 | Iwanaga ........................ 180/229 |
| 2009/0108629 A1* | 4/2009 | Takahashi et al. ............ 296/192 |
| 2009/0108630 A1* | 4/2009 | Nakao et al. .................. 296/192 |
| 2011/0155493 A1* | 6/2011 | Kogo et al. ................... 180/68.3 |
| 2011/0180345 A1* | 7/2011 | Iida et al. ...................... 180/309 |
| 2012/0061989 A1* | 3/2012 | Yasuhara et al. ............. 296/78.1 |
| 2012/0133117 A1* | 5/2012 | Nagura et al. ................. 280/781 |
| 2012/0193164 A1* | 8/2012 | Nagura et al. ................. 180/291 |
| 2012/0228046 A1* | 9/2012 | Usa et al. ...................... 180/229 |
| 2013/0248272 A1* | 9/2013 | Nakamura .................... 180/229 |
| 2013/0249238 A1* | 9/2013 | Yokouchi et al. ........... 296/180.1 |
| 2013/0320697 A1* | 12/2013 | Yokouchi et al. ............. 296/78.1 |
| 2014/0090912 A1* | 4/2014 | Kontani et al. ............... 180/68.3 |
| 2014/0202782 A1* | 7/2014 | Tsukui .......................... 180/68.1 |
| 2014/0252797 A1* | 9/2014 | Toriyama .................... 296/180.1 |

\* cited by examiner

LOWER PART STRUCTURE FOR VEHICLE

CROSS-REFERENCE TO RELATED APPLICATIONS

The present application claims priority under 35 U.S.C. §119 to Japanese Patent Application No. 2013-047055, filed Mar. 8, 2013, the contents of which is incorporated herein, by reference, in its entirety.

TECHNICAL FIELD

The present invention relates to an improvement of a lower part structure of a vehicle.

BACKGROUND OF THE INVENTION

A lower part structure for a motorcycle has been known in which a cowl is provided at a lower portion of a vehicle body for guiding airflow (airflow produced by traveling of the vehicle) having flowed past a radiator (see, for example, Japanese Patent Laid-open No. 2008-18904 (FIGS. 1 and 7)).

As shown in Japanese Patent Laid-open No. 2008-18904, a cowling for covering the periphery of a radiator is provided at a front portion of the vehicle. A sub cowling is provided at a lower portion of the vehicle body rearwardly of the cowling, in side view of the vehicle. A front portion of the sub cowling is overlapping with a lower portion of the cowling. The sub cowling includes: left and right inner cowls having side plate portions inclined toward an oblique rear side of the vehicle; and a lower cowl disposed under the inner cowls. The airflow having passed through the radiator is guided toward oblique outer rear sides of the vehicle by the side plate portions of the left and right inner cowls.

In this case, the airflow flowing past the side plate portions of the left and right inner cowls is guided toward oblique rear sides of the vehicle. However, air having passed through the radiator in the center of the vehicle width is liable to be dispersed toward the upper and lower sides and the left and right sides. Thus, there has been room for improvement.

SUMMARY OF THE INVENTION

A lower part structure of a motorcycle is provided which enables air having flowed past a radiator to be guided toward transversely outer sides more efficiently.

According to a first feature, there is provided a lower part structure for a vehicle which has a body frame provided between a front wheel and a rear wheel, an engine provided on the body frame, a radiator disposed forwardly of the engine and rearwardly of the front wheel, and an air guide port opening forward at a position forwardly of the radiator, with the body frame and the radiator covered with a cowling. The cowling includes side cowls covering lateral sides of the radiator. An undercover covers a lower part of the body frame rearwardly of the radiator, and the undercover includes a V-shaped part, and air guide surfaces extending obliquely from the V-shaped part toward transversely outer rear sides. The V-shaped part is disposed adjacent to a rear surface of the radiator, the rear surface facing toward a rear side of the vehicle.

According to a second feature, the V-shaped part is disposed in the center of the undercover, in the vehicle width direction, and the engine is disposed rearwardly and upwardly of the V-shaped part.

According to a third feature, at least a part of the V-shaped part extends to a lower side of the radiator, and is inclined toward an oblique rear upper side in side view of the vehicle.

According to a fourth feature, the side cowls extend rearward from the lateral sides of the radiator, air ducts are formed between transversely inner surfaces of the side cowls and the air guide surfaces of the undercover, and air exhaust ports are provided at rear portions of the side cowls, and the undercover and the side cowls are at least partly overlapping with each other in side view of the vehicle.

According to a fifth feature, an exhaust pipe is connected to the engine, the undercover is provided with openings in the air guide surfaces, and the exhaust pipe extends from the engine downward between the engine and the radiator, extends along the air guide surface, and extends rearward while passing through the opening and then on an inner side of the undercover.

In accordance with the first feature, the undercover has the V-shaped part, which is disposed rearwardly of and adjacent to the radiator. In addition, the undercover has the air guide surfaces by which air having flowed past the radiator is guided obliquely toward the transversely outer rear sides. Therefore, the airflow (produced by traveling of the vehicle) having passed through the radiator is divided at the V-shaped part to the transversely left and right sides, to be obliquely guided by the air guide surfaces toward the transversely outer rear sides. Consequently, the airflow having flowed past the radiator can be efficiently guided toward the rear side of the vehicle, by the V-shaped part and the air guide surfaces extending from the V-shaped part, of the undercover.

In accordance with the second feature, the V-shaped part is disposed in the center of the undercover in the vehicle width direction, so that the airflow having passed through the radiator is evenly divided to the left and right sides. Since the airflow is thus evenly divided to the left and right sides, there is no risk that the aerodynamic performance of the vehicle might be worsened. In addition, with the engine disposed in a space formed rearwardly and upwardly of the V-shaped part, the space formed in the center in the vehicle width direction on the rear side of an apex portion can be effectively utilized. Accordingly, the limited space in the vehicle can be utilized effectively.

In accordance with the third feature, at least a part of the V-shaped part extends to the lower side of the radiator, so that the airflow flowing under the radiator can also be divided evenly to the left and right sides. As a result, the aerodynamic performance of the vehicle can be enhanced more. In addition, since the V-shaped part is inclined toward an oblique rear upper side, the airflow having passed through the radiator is guided rearwardly upward. The airflow thus guided rearwardly upward impinges on the engine, whereby cooling performance as to the engine can be enhanced.

In accordance with the fourth feature, the airflow having passed through the radiator and then through the air ducts flows rearward from the air exhaust ports. In this instance, the velocity of the airflow flowing along the side cowls is higher than the velocity of the airflow flowing rearward from the air exhaust ports. The airflow flowing along the side cowls, which is faster than the velocity of the airflow having flowed past the radiator, promotes the flow of the airflow flowing rearward from the air exhaust ports of the radiator. Therefore, the airflow having passed through the radiator can be made to flow efficiently.

In accordance with the fifth feature, the air guide surfaces of the undercover are provided with the openings, and the exhaust pipe is passed through the opening. Since the exhaust pipe extends rearward while passing on the inner side of the undercover, the exhaust pipe is prevented from projecting toward a transversely outer side. In addition, the exhaust pipe is prevented from becoming enlarged in length. Since the exhaust pipe is disposed to be compact and short, external appearance quality of the vehicle can be maintained.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
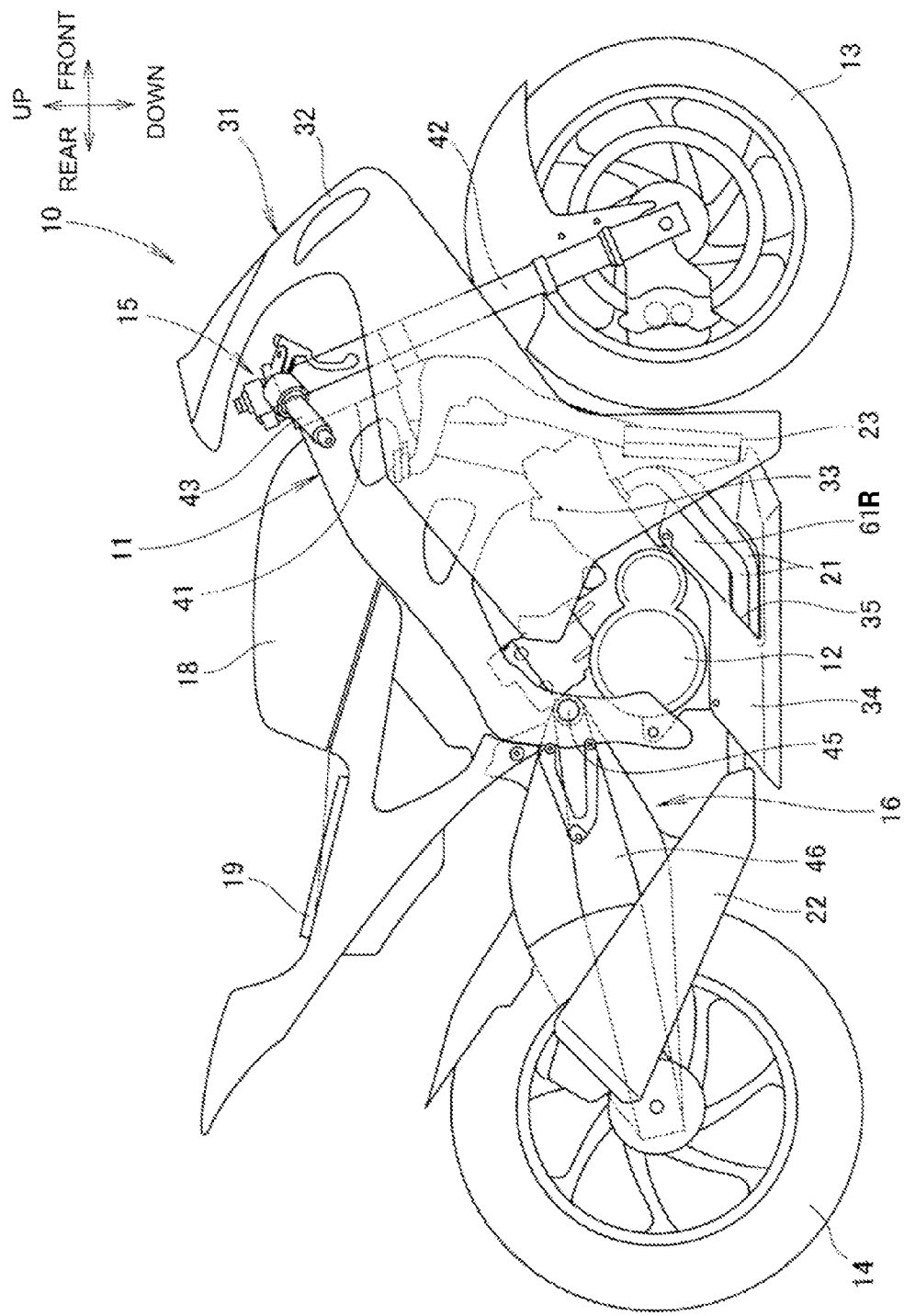
FIG. 1 is a right side view of a motorcycle.

Now, an embodiment of the present invention will be described in detail below. In the drawings and the embodiment, the terms "up," "down," "front," "rear," "left," and "right" refer to the respective directions (or sides) as viewed from the driver seated on the motorcycle.

Embodiment

An embodiment of the present invention will be described based on the drawings.

As shown in FIG. 1, the motorcycle 10 is a saddle type vehicle including: a body frame 11; a front wheel steering part 15 provided at a front portion of the body frame 11 and supporting a front wheel 13; an engine 12 supported on the body frame 11; a rear wheel suspension part 16 extending at a rear portion of the body frame 11 toward the rear side of the vehicle and supporting a rear wheel 14; a fuel tank 18 mounted on the body frame 11 rearwardly of the front wheel steering part 15; a seat 19 on which to seat a rider, the seat 19 being mounted on the body frame 11 rearwardly of the fuel tank 18; exhaust pipes 21 connected to the engine 12 and extending from the engine 12; a muffler 22 connected to the tips of the exhaust pipes 21 and extending toward the rear side of the vehicle; a radiator 23 disposed forwardly of the engine 12 and rearwardly of the front wheel 13; and a cowling 31 covering the body frame 11 and the radiator 23 at a position forwardly of the radiator 23. The rider is seated astride the seat 19 provided between the front wheel 13 and the rear wheel 14. Incidentally, the radiator 23 means a core part of the radiator 23.

The front wheel steering part 15 includes, as main elements: a front fork 42 extending obliquely toward a front lower side of the vehicle from a head pipe 41 constituting the front end of the body frame 11; a handlebar 43 attached to the upper end of the front fork 42 and permitting the rider to perform a steering operation therewith; and the front wheel 13 rotatably mounted on the lower ends of the front fork 42.

The rear wheel suspension part 16 includes, as main elements: a pivot shaft 45 extending in the transverse direction (vehicle width direction) at a lower portion located at a longitudinal-directionally roughly central portion of the body frame 11; a swing arm 46 extending rearward from the pivot shaft 45 and turnably supported on the pivot shaft 45; the rear wheel 14 rotatably mounted on the rear end of the swing arm 46; and a cushion unit (not shown) interposed between the swing arm 46 and the body frame 11.

The cowling 31 includes: a front cowl 32 covering the front side of the vehicle; side cowls 33 extending toward the rear side of the vehicle continuously with the front cowl 32 and covering lateral sides of the radiator 23; and an undercover 34 covering a lower portion of the body frame 11 rearwardly of the radiator 23.

Figure 2:
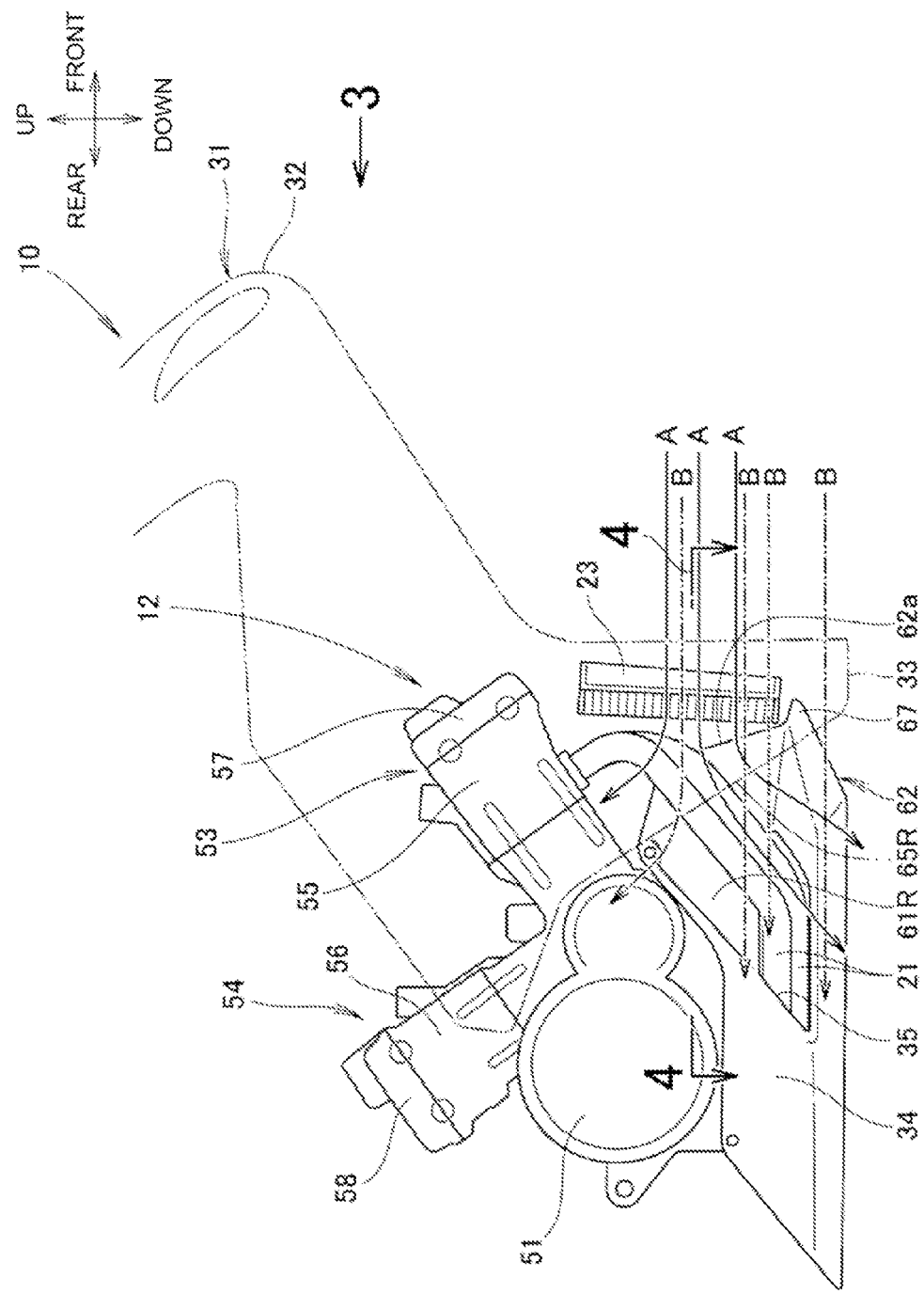
FIG. 2 is an enlarged view of a major part of FIG. 1.

As shown in FIG. 2, the engine 12 is a V-type engine which includes a crankcase 51 as well as a front bank part 53 extending obliquely from the crankcase 51 toward a front upper side of the vehicle and a rear bank part 54 extending obliquely from the crankcase 51 toward a rear upper side of the vehicle. The front and rear bank parts 53 and 54 include cylinder parts 55 and 56, and head covers 57 and 58 mounted on upper surfaces of the cylinder parts 55 and 56, respectively. The exhaust pipes 21 are connected to the cylinder parts 55. The exhaust pipe for the rear bank part 54 is omitted in the drawing.

The radiator 23 to which airflow produced by traveling of the vehicle is inputted is disposed forwardly of the crankcase 51, at substantially the same level in the height direction as the crankcase 51. The side cowls 33 are disposed on the lateral sides of the radiator 23. The undercover 34 is disposed on the vehicle rear side of the core part of the radiator 23 and under the crankcase 51 of the engine 12. The undercover 34 is provided in a front portion thereof with an opening 35 through which the exhaust pipes 21 are passed.

Figure 3:
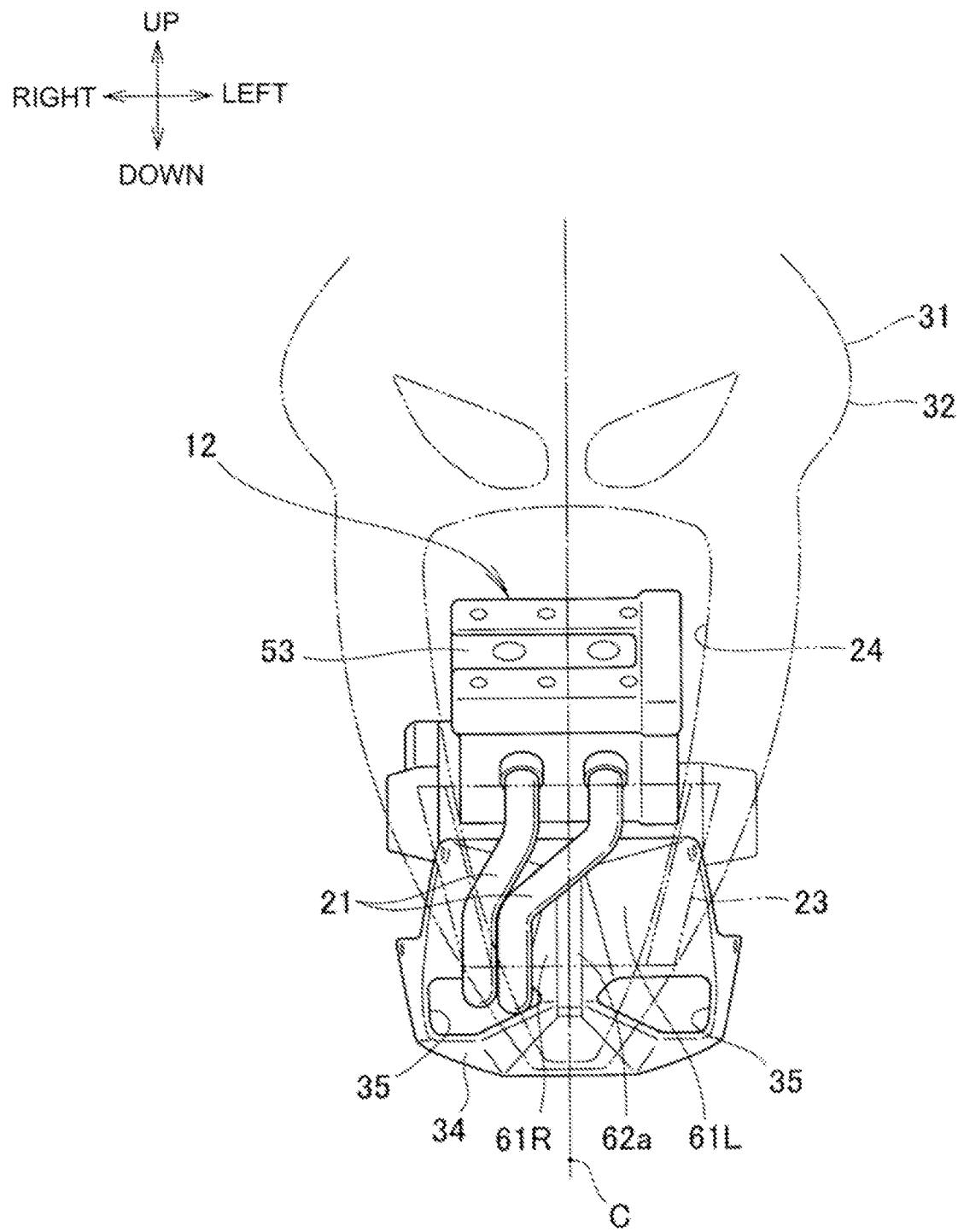
FIG. 3 is a front view (view taken along arrow 3 of FIG. 2) of the motorcycle.

As shown in FIG. 3, the front cowl 32 is provided with an air guide port 24 through which to take in the airflow (produced by traveling of the vehicle). The air guide port 24 is provided in an area ranging from an intermediate portion to a lower portion in the height direction, in front view of the vehicle. The radiator 23 is disposed at such a position as to at least partially oppose the air guide port 24. In other words, the front cowl 32 as a component of the cowling 31 is a member for covering the body frame 11 (see FIG. 1) and the radiator 23, and is provided, at a position forwardly of the radiator 23, with the air guide port 24 opening to the front side.

Two exhaust pipes 21 extend downward from the front bank part 53 of the engine 12. These exhaust pipes 21 enter the right-side opening 35 of the openings 35 opened in the undercover 34. Incidentally FIG. 3 is a view taken along arrow 3 of FIG. 2, and the radiator in FIG. 2 is drawn in imaginary lines (instead of solid lines). Reference sign C denotes the longitudinal center line of the vehicle body.

Now, the configuration of the undercover 34 and its surroundings will be described.

Figure 4:
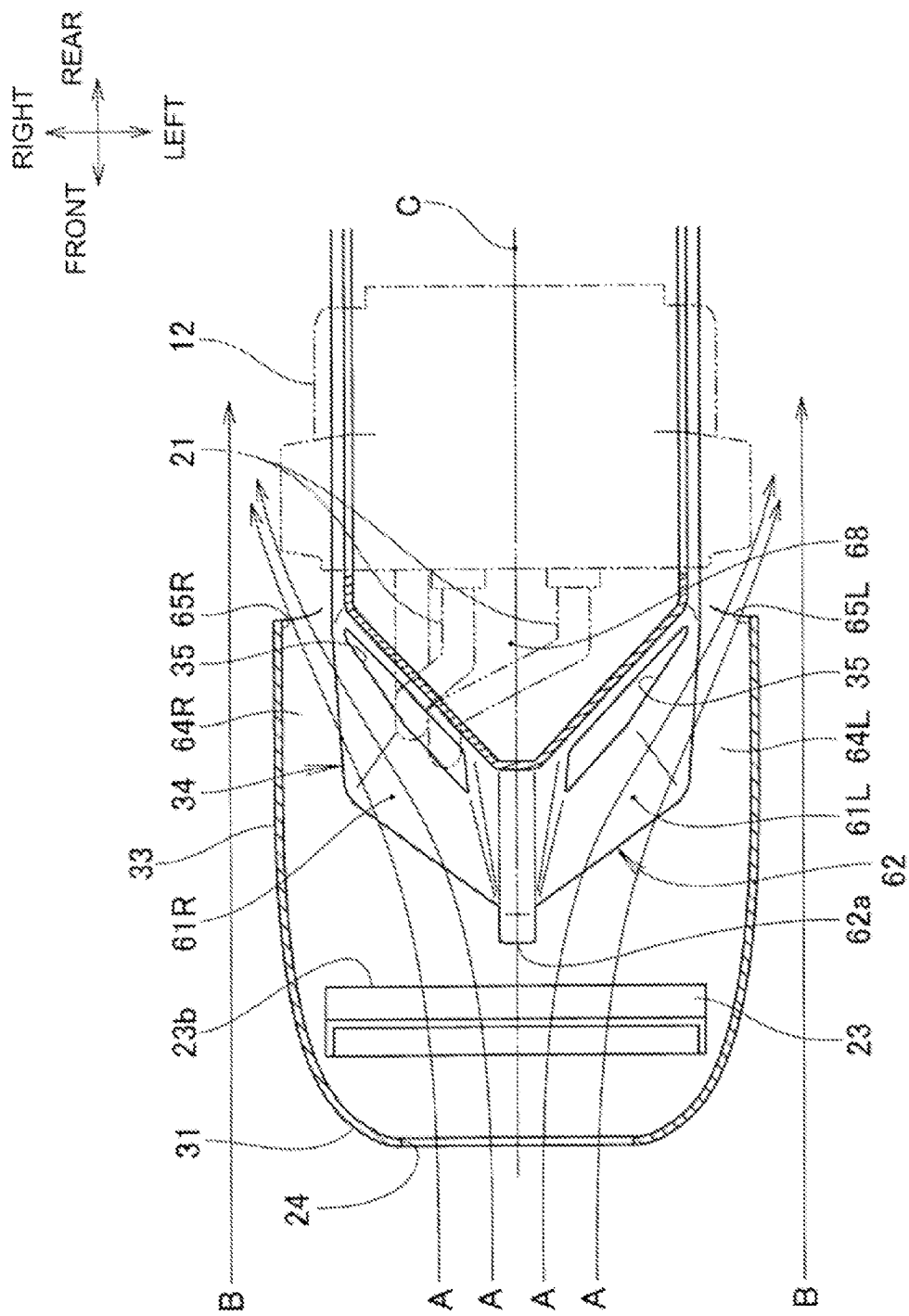
FIG. 4 is a major part sectional view (sectional view taken along line 4-4 of FIG. 2) showing an undercover and the surroundings thereof.

As shown in FIGS. 1 and 4, the undercover 34 has the openings 35 formed in air guide surfaces 61L and 61R thereof. The exhaust pipes 21 extend from the engine 12 downward between the engine 12 and the radiator 23, extend along the air guide surface 61R of the undercover 34, extend rearward while passing through the opening 35 and then passing on the inner side of the undercover 34, extend rearward from the undercover 34, and are connected to the muffler 22 disposed on the right side, with respect to the vehicle width direction.

The undercover 34 includes: a V-shaped part 62 having an apex portion 62a which protrudes forwardly at a center position in the width-wise direction and has a flat surface facing the forward direction (shaped like the bow of a boat); and the air guide surfaces 61L and 61R extending obliquely from the V-shaped part 62 toward transversely outer rear sides. The V-shaped part 62 is disposed close to a rear surface 23b, facing toward the rear side of the vehicle, of the radiator 23. The V-shaped part 62 is disposed in the center of the vehicle width. Reference sign C denotes the longitudinal center line of the vehicle body.

The side cowls 33 extend rearward from lateral sides of the radiator 23. Air ducts 64L and 64R are formed between the transversely inner surfaces of the side cowls 33 and the air guide surfaces 61L and 61R of the undercover 34, respectively. Air exhaust ports 65L and 65R are provided at rear portions of the side cowls 33.

In FIG. 2, at least a part of the V-shaped part 62 extends to the lower side of the radiator 23, and is inclined toward an oblique rear upper side in side view of the vehicle. In addition, the engine 12 is disposed rearwardly of and upwardly of the V-shaped part 62. Besides, the undercover 34 and the side cowls 33 are at least partly overlapping with each other, in side view of the vehicle. Incidentally, FIG. 4 is a sectional view taken along line 4-4 of FIG. 2, in which the side cowl is drawn in a solid line (instead of an imaginary line).

Operation of the lower part structure for a vehicle as above will now be described below.

Referring to FIGS. 2 and 4, the undercover 34 has the V-shaped part 62. The V-shaped part 62 is disposed rearwardly of and close to the radiator 23. The undercover 34 has the air guide surfaces 61L and 61R by which the airflow (produced by traveling of the vehicle) having flowed past the radiator 23, is guided obliquely from the V-shaped part 62 toward transversely outer rear sides. The airflow having flowed past the radiator 23 is divided by the V-shaped part 62 to transversely left and right sides, to be guided obliquely toward transversely outer rear sides by the air guide surfaces 61L and 61R. Thus, the airflow having passed through the radiator 23 can be efficiently guided toward the rear side of the vehicle by the V-shaped part 62 and the air guide surfaces 61L and 61R extending from the V-shaped part 62, of the undercover 34.

The airflow indicated by arrows A, having flowed past the radiator 23 and then through the air ducts 64L and 64R, flows rearward through the air exhaust ports 65L and 65R. In this instance, the velocity of the airflow indicated by arrows B flowing along the vehicle outer sides of the side cowls 33 is higher than the velocity of the airflow flowing rearward through the air exhaust ports 65L and 65R. As a result, the airflow flowing along the side cowls 33, which is faster than the velocity of the airflow having passed through the radiator 23, promotes the flow of the airflow flowing rearward through the air exhaust ports 65L and 65R of the radiator 23. Therefore, the airflow having passed through the radiator 23 can be made to flow efficiently.

Since the V-shaped part 62 and the apex portion 62a thereof are disposed in the center of the vehicle width, the airflow having passed through the radiator 23 is evenly divided to the left and right sides. Since the airflow is thus evenly divided to the left and right sides, there is no risk that the aerodynamic performance of the vehicle might be spoiled.

With the engine 12 disposed in the space on the rear and upper side of the V-shaped part 62, a space 68 formed in the center of the vehicle width on the rear side of the apex portion can be utilized effectively. Accordingly, the limited space in the vehicle can be utilized effectively.

At least a part of the V-shaped part 62 extends to the lower side of the radiator 23, and is a lower extension part 67. Then, the airflow flowing on the lower side of the radiator 23 can also be divided evenly to the left and right sides. As a result, the aerodynamic performance of the vehicle can be enhanced more. In addition, since the V-shaped part 62 is inclined toward the oblique rear upper side, the airflow having passed through the radiator 23 is guided toward the rear upper side. The airflow having been guided toward the rear upper side impinges on the engine 12, whereby cooling performance as to the engine 12 can be enhanced.

Referring to FIG. 3 as well, the air guide surface 61R of the undercover 34 is provided with the opening 35, and the exhaust pipes 21 are passed through the opening 35. Since the exhaust pipes 21 extend rearward while passing on the inner side of the undercover 34, the exhaust pipes 21 do not project to the transversely outer side. In addition, the exhaust pipes 21 are prevented from being enlarged in length. Since the exhaust pipes 21 are arranged to be compact and short, external appearance quality of the vehicle can be maintained.

Incidentally, while the present invention has been applied to a motorcycle in this embodiment, the invention is also applicable to three-wheeled vehicles and may well be applied to general vehicles.

The present invention is suitable for application to motorcycles which have a radiator and an undercover covering a lower part of the vehicle rearwardly of the radiator.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A lower part structure for a vehicle which has a body frame provided between a front wheel and a rear wheel, an engine provided on the body frame, a radiator disposed forwardly of the engine and rearwardly of the front wheel, and a cowling including an air guide port opening at a position forward of the radiator and side cowls covering lateral sides of the radiator, the body frame and the radiator being covered by the cowling, the lower part structure comprising:
   an undercover configured to cover a lower part of the body frame rearwardly of the radiator, said undercover comprising a V-shaped part having an apex portion protruding forwardly, and
   air guide surfaces extending obliquely from said V-shaped part toward transverse outer rear sides of the vehicle,
   wherein said V-shaped part is configured to be disposed adjacent to a rear surface of the radiator, the rear surface of the radiator facing toward a rear side of the vehicle.

2. The lower part structure for the vehicle according to claim 1,
   wherein said V-shaped part is disposed in the center of said undercover, in a vehicle width direction, and
   wherein said undercover is configured to be disposed such that the engine is rearward and upward of said V-shaped part.

3. The lower part structure for the vehicle according to claim 1,
   wherein at least a part of said V-shaped part is configured to extend to a lower side of the radiator, and is inclined toward an oblique rear upper side of the vehicle, in side view of the vehicle.

4. The lower part structure for the vehicle according to claim 2,
   wherein at least a part of said V-shaped part is configured to extend to a lower side of the radiator, and is inclined toward an oblique rear upper side of the vehicle, in side view of the vehicle.

5. The lower part structure for the vehicle according to claim 1,
   wherein the side cowls extend rearward from the lateral sides of the radiator, wherein said undercover is configured such that air ducts are formed between transverse inner surfaces of the side cowls and said air guide surfaces of said undercover, and air exhaust ports are provided at rear portions of the side cowls, and wherein said undercover and the side cowls are configured to at least partly overlap with each other in side view of the vehicle.

6. The lower part structure for the vehicle according to claim 2, wherein the side cowls extend rearward from the lateral sides of the radiator, wherein said undercover is configured such that air ducts are formed between transverse inner surfaces of the side cowls and said air guide surfaces of said undercover, and air exhaust ports are provided at rear portions of the side cowls, and wherein said undercover and the side cowls are configured to at least partly overlap with each other in side view of the vehicle.

\* \* \* \* \*